UNITED STATES PATENT OFFICE.

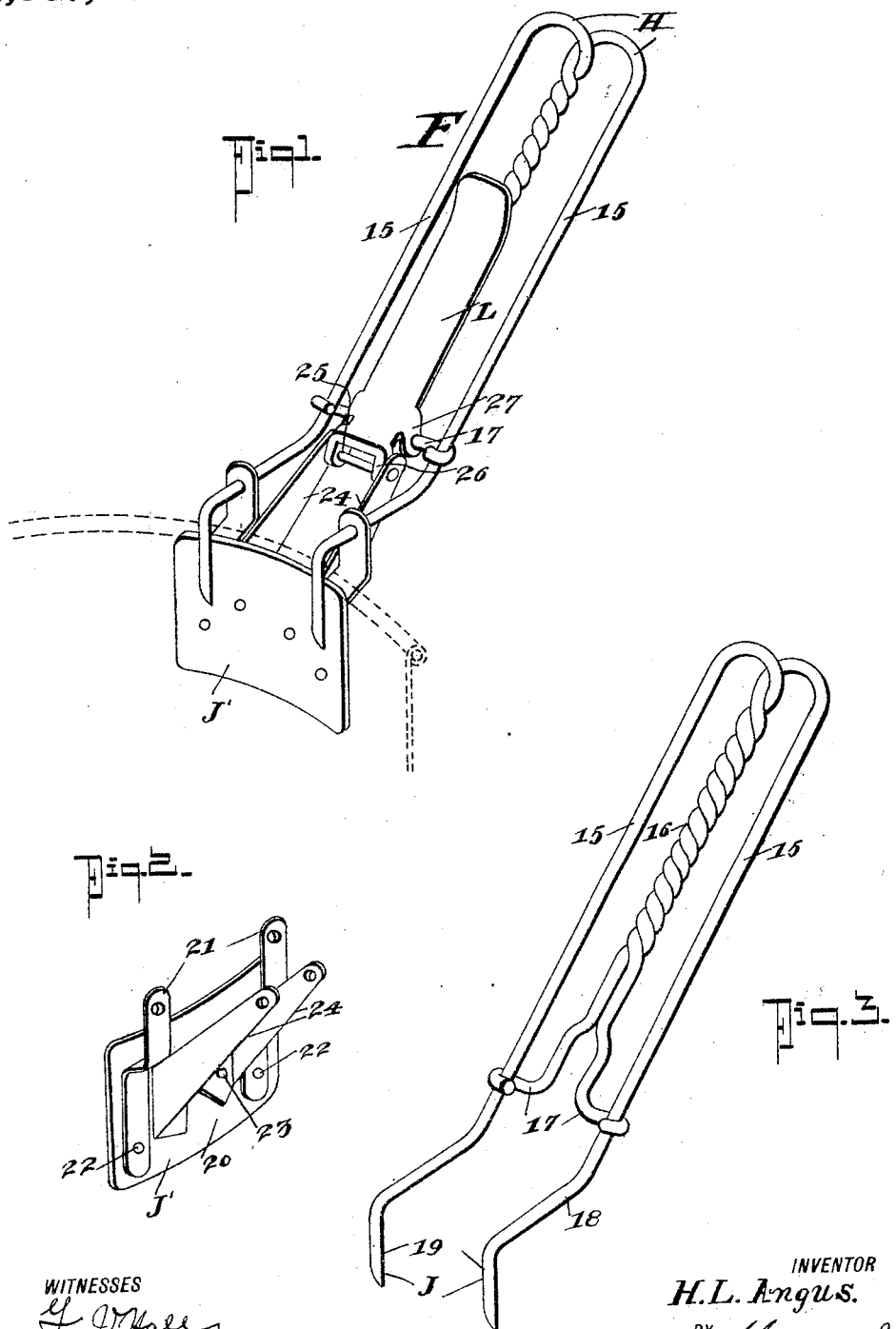

HARVEY LEE ANGUS, OF INVERNESS, MONTANA.

LIFTER FOR COOKING VESSELS.

1,367,529.	Specification of Letters Patent.	Patented Feb. 8, 1921.

Application filed February 16, 1920. Serial No. 359,030.

*To all whom it may concern:*

Be it known that I, HARVEY LEE ANGUS, a subject of the King of Great Britain, and a resident of Inverness, in the county of Hill and State of Montana, have invented certain new and useful Improvements in Lifters for Cooking Vessels, of which the following is a specification.

My invention relates to lifters for cooking vessels, and a purpose of my invention is the provision of a lifter of simple, durable and efficient construction which includes coöperating jaws that are adapted to be actuated to firmly embrace a vessel for manually lifting the same, one of such jaws being locked when in the operative position to prevent the vessel accidentally slipping while being carried by the lifter.

I will describe one form of lifter embodying my invention, and will then point out the novel features thereof in claims.

In the drawings:

Figure 1 is a view showing in perspective one form of lifter embodying my invention in the active position upon a vessel.

Figs. 2 and 3 are detail perspective views of parts of the lifter shown in Fig. 1.

Referring specifically to the drawings, in which similar reference characters refer to similar parts, F designates generally a frame comprised of two lengths of wire bent intermediate their ends to provide a handle H having parallel sides 15 which are connected at the upper end of the handle by branches 16. The branches 16 are disposed between the sides 15 and are intertwisted for a major portion of their length so as to maintain a rigid connection between the two wires. The lower ends of the branches 16 are flared outwardly in opposite directions to provide arms 17 which are secured to the sides 15 to aid in rigidly connecting the sides. These arms 17 also serve as pivots as will be hereinafter described.

That portion of the sides 15 disposed below the arms 17 is bent at an obtuse angle to provide substantially horizontal portions 18, and then downwardly at right angles to provide vertical portions 19. The portions 19 constitute the stationary jaw of the lifter. For the sake of description, the stationary jaw will be hereinafter referred to as J and this jaw is adapted to coact with a movable jaw J′ which, as shown in Fig. 2, comprises a plate 20 of substantially rectangular formation which is curved in the form of an arc to conform to the curvature of the side of a vessel. The plate 20 is slidably mounted upon the horizontal portions 18 by means of ears 21 which are secured in vertical position upon the rear side of the plate by means of rivets 22. Secured to the rear side of the plate 20 by rivets 23 are a pair of arms 24, such arms being preferably disposed between but in the rear of the ears 21. The arms 24 are connected at their upper ends by a pintle 25, and secured to this same pintle 25 are a pair of ears 26 formed on the lower end of a lever L. The lever L constitutes the actuating means for the movable jaw J′ and is fulcrumed upon the handle H by pivot ears 27 which loosely embrace the arms 17. As shown in Fig. 1, the lever L has that portion disposed below the ears 27 bent at an obtuse angle so as to effect a toggle action in locking the jaw J in the active position.

In operation, the jaw J′ normally occupies what I term a releasing position wherein it is spaced from the jaw J a distance sufficient to permit the ready insertion of the side wall of a cooking vessel between the jaws. In the releasing position of the jaw J′, the lever L is spaced from the handle H so as to assume a substantially vertical position. When gripping a cooking vessel, the jaw J′ is moved toward the jaw J so as to occupy a gripping position by depressing the upper end of the lever L so as to move the same into engagement with the handle H. During this movement of the lever L, its forward or lower end moves upwardly in the path of an arc thus causing a forward and upward movement of the arms 24 to effect the forward sliding of the jaw J′ into gripping position with respect to the jaw J. In the final position of the lever L, the pintle 25 occupies such a position that when lifting a cooking vessel by the handle H, the weight of the vessel will be ineffective to move the lever so that the jaw J′ as a consequence is locked in the gripping position. This locking action is secured as a result of the disposition of the arms 24 with respect to the fulcrum point of the lever L, it being noted that with the jaw J′ in the gripping position, any rearward pressure upon the same will tend to rock the lower end of the lever in a clockwise direction as when viewed in Fig. 1 thus forcing the upper end of the lever against the handle H. It will therefore be seen that after having moved the lever L to gripping position, it is unnecessary to continue to grip the lever while the vessel is being carried by the lifter.

Although I have herein shown and described only one form of lifter embodying my invention, it is to be understood that various changes and modifications may be made herein without departing from the spirit of the invention or the spirit and scope of the appended claims.

What I claim is:

1. A lifter for cooking vessels comprising, a handle, a stationary jaw formed on the handle, a movable jaw slidably associated with the stationary jaw, and a lever fulcrumed on the handle and connected to the movable jaw to effect a sliding of the latter toward or away from the stationary jaw for causing the same to occupy gripping and releasing positions, respectively, and to lock the movable jaw in gripping position.

2. A lifter for cooking vessels comprising, a frame comprising two lengths of wire bent to provide a handle and a stationary jaw, a movable jaw slidable on the frame, a lever fulcrumed on the frame, arms fixed to the movable jaw and pivotally connected to said lever to effect a sliding of the jaw toward and away from the stationary jaw when the lever is rocked.

3. A lifter for cooking vessels comprising, a frame comprising two lengths of wire bent to provide a handle and a stationary jaw, a movable jaw slidable on the frame, a lever fulcrumed on the frame, arms fixed to the movable jaw and pivotally connected to said lever to effect a sliding of the jaw toward and away from the stationary jaw when the lever is rocked, the fulcrum of said lever being such as to prevent sliding of the movable jaw when the lever is in one extreme position.

4. A lifter for cooking vessels comprising, a frame formed of two lengths of wire bent to provide a handle having parallel side portions and an intermediate twisted portion, the free end of the twisted portion being bent outwardly and secured to the side portions to provide arms, the free ends of the side portion being bent to provide a stationary jaw, a movable jaw slidable on said side portion, a lever fulcrumed on said arms, and arms fixed to the movable jaw and pivotally connected to one end of said lever, for the purpose described.

HARVEY LEE ANGUS.